(12) United States Patent
Dunlop et al.

(10) Patent No.: US 7,326,817 B2
(45) Date of Patent: Feb. 5, 2008

(54) PROCESS FOR REDUCING THE TOXICITY OF HYDROCARBONS

(75) Inventors: Carl Dunlop, Cape Town (ZA); Stewart Hlohloza, Mossel Bay (ZA); Petrus Johannes Hoffmann, Durbanville (ZA); Cyril David Knottenbelt, Mossel Bay (ZA); Leon Walliser, Mossel Bay (ZA)

(73) Assignee: Petroleum Oil and Gas Corporation of South Africa (Pty) Ltd., Mossel Bay, Cape (ZA)

( * ) Notice: Subject to any disclaimer, the term of this patent is extended or adjusted under 35 U.S.C. 154(b) by 435 days.

(21) Appl. No.: 10/974,467

(22) Filed: Oct. 27, 2004

(65) Prior Publication Data

US 2005/0197256 A1 Sep. 8, 2005

Related U.S. Application Data

(63) Continuation of application No. PCT/ZA02/00086, filed on May 24, 2002.

(30) Foreign Application Priority Data

Apr. 30, 2002 (ZA) .................. 2002/03429

(51) Int. Cl.
    C07C 2/04 (2006.01)
    C07C 7/09 (2006.01)
(52) U.S. Cl. .............. 585/254; 585/255; 585/502; 585/510; 585/530; 585/664; 585/800; 507/203
(58) Field of Classification Search ............ None
    See application file for complete search history.

(56) References Cited

U.S. PATENT DOCUMENTS

| 4,631,136 | A | | 12/1986 | Jones |
| H1000 | H | | 12/1991 | Patel et al. |
| 5,096,883 | A | | 3/1992 | Mercer et al. |
| 5,189,012 | A | | 2/1993 | Patel et al. |
| 5,498,596 | A | | 3/1996 | Ashjian et al. |
| 5,569,642 | A | | 10/1996 | Lin |
| 5,589,442 | A | | 12/1996 | Gee et al. |
| 5,635,457 | A | | 6/1997 | Van Slyke |
| 5,866,748 | A | | 2/1999 | Wittenbrink et al. |
| 6,096,690 | A | | 8/2000 | Mart et al. |
| 2002/0183576 | A1 | * | 12/2002 | Flego et al. ........... 585/533 |

FOREIGN PATENT DOCUMENTS

| GB | 2117429 A | 10/1983 |
| GB | 2166782 A | 5/1986 |

OTHER PUBLICATIONS

PCT International Search Report for PCT/ZA02/00086 mailed May 8, 2003.
PCT International Preliminary Examination Report for PCT/ZA02/00086 completed Aug. 31, 2004.

* cited by examiner

*Primary Examiner*—Marc S. Zimmer
(74) *Attorney, Agent, or Firm*—Knobbe Martens Olson & Bear LLP

(57) ABSTRACT

This invention relates to a method for reducing the toxicity of a mixture of hydrocarbons by means of fractional distillation, a distillate having a reduced toxicity and a composition including the distillate.

8 Claims, No Drawings

US 7,326,817 B2

PROCESS FOR REDUCING THE TOXICITY OF HYDROCARBONS

RELATED APPLICATIONS

This application is a continuation, under 35 U.S.C. §120, of International Patent Application No. PCT/ZA02/00086, filed on May 24, 2002, under the Patent Cooperation Treaty (PCT), which was published by the International Bureau in English on Nov. 13, 2003, which designates the United States, and which claims the benefit of South African Patent Application No. 2002/3429, filed Apr. 30, 2002.

FIELD OF THE INVENTION

This invention relates to a method for reducing the toxicity of a mixture of hydrocarbons by means of fractional distillation, a distillate having a reduced toxicity and a composition including the distillate.

BACKGROUND OF THE INVENTION

Refined crude or synthetic oils or, compositions which include refined crude or synthetic oils, released into the environment are toxic and/or detrimental to the environment and are often used in industry with negative effects to the environment, for example, drilling fluids (sometimes called muds) used in offshore oil and gas production and exploration. Drilling fluids are used to lubricate the drill bit and to carry the debris, such as drill cuttings, up to the surface for disposal. The debris is normally separated from the drilling fluids, however, the debris retain a layer of the drilling fluid. The oil covered debris resulting from such well boring operations need to be shipped to land for safe disposal or, if it were to be discharged onto the seabed or overboard into the sea, it needs to comply with strict environmental impact restrictions. Due to the high expense of shipping and disposing of the mud drilling compositions, a need exists to use drilling fluid which can be discharged onto the seabed or overboard and which complies with the strict environmental impact restrictions. One such requirement is the Environmental Protection Agency (EPA) $LC_{50}$ requirement of more than 30 000 result in a Mysid shrimp (*Mysidopsis Bahia*) bioassay prescribed in 1984 EPA-600/3-84-067. Generally, the Mysid shrimp bioassay measures the toxicity of the water column in which the shrimps live. Recently it became apparent that not only is the toxicity of the water column relevant, but even more so is the toxicity of the seabed sediment, onto which discharged debris settle after it has been discharged overboard. Therefore, more relevant for drilling fluids used where the debris is to be discharged overboard, is the requirement that oils used for the manufacture of such drilling fluids pass a stringent ten day marine amphipod (*Leptocheirus plumulosus*) acute sediment toxicity test in accordance with American Society for Testing and Materials (ASTM) Guideline E 1367, EPA 600/R-94/025, which tests the toxicity of the actual marine sediment. This test is especially relevant to all offshore drilling platforms since the discharge of toxic drilling mud compositions from a drilling platform onto the seabed would have a significant negative environmental impact on the seabed.

In this specification, the hydrocarbons will be understood to be a collective term for molecules comprising carbon and hydrogen only and include non cyclic saturated hydrocarbons referred to as "paraffins", unsaturated hydrocarbons referred to as "olefins", cyclic hydrocarbons referred to as "cycloparaffins" and aromatic hydrocarbons referred to as "aromatics". Straight chain paraffins will be referred to as n-paraffins and branched paraffins referred to as iso-paraffins. Synthetic hydrocarbons will be understood to mean any hydrocarbons derived from a chemical process in which a chemical reaction takes place, as opposed to natural hydrocarbons, which is refined or distilled from crude oil.

Natural hydrocarbons, which are refined or distilled from crude oil are normally contaminated with high levels aromatics and are relatively toxic to marine life, making these drilling fluids that contain "natural" crude hydrocarbons environmentally unacceptable. High levels of n-paraffins in these fluids would have poor cold flow characteristics limiting their application in cold environments due to formation of waxy deposits.

The process for the preparation and use of plant or vegetable oil based environmentally friendly drilling fluid has been described in U.S. Pat. No. 4,631,136.

The use of synthetic hydrocarbons became popular due to their low aromatic content and availability. Several patents described the use of synthetic hydrocarbons for drilling fluids. U.S. Pat. No. 5,096,883 discloses the use of $C_{18}$ to $C_{40}$ hydrocarbons derived from dimerised 1-decene which is esterified. The good biodegradability of esters is well known, but esters are hydrolytically unstable. U.S. Pat. No. 5,589,442 discloses the use of non alpha, linear internal $C_{14}$ to $C_{18}$ olefins obtained by an alpha olefin isomerisation process. U.S. Pat. No. 5,569,642 discloses the use of a preferable $C_{14}$ to $C_{20}$ blend of n-paraffins and iso-paraffins. This patent also teaches that iso-paraffins having up to 40 carbon atoms per molecule are liquids over the temperature range of interest for drilling fluids, whereas, n-paraffins having more than about 16 to 23 carbon atoms per molecule are waxy solids. This is important with regard to the viscosity and rheology of drilling fluids. Similarly, U.S. Pat. No. 5,866,748 discloses the use of a mixture of $C_8$ to $C_{20}$ n-paraffins and iso-paraffins derived from hydro isomerisation of C8 to $C_{20}$ n-paraffins. U.S. Pat. No. 6,096,690 discloses, by way of example, the use of a mixture of $C_{13}$ to $C_{18}$ n-paraffins and iso-paraffins derived from hydro cracking of Fisher Tropsch waxes. This patent further claims that mono methyl iso-paraffins are less toxic than more branched iso-paraffins. U.S. Pat. No. 5,498,596 discloses the use of a mixture of $C_{10}$ to $C_{18}$ paraffins from mineral oils and poly(alpha olefins) derived from the dimer of decene. U.S. Pat. No. 5,189,012 and a related U.S. Registered Statutory Invention No. H1000 discloses the use of branched chain oligomers and unhydrogenated synthetic hydrocarbon compositions of $C_9$ to $C_{71}$ synthesized from oligomerization of $C_2$ to $C_{14}$ olefins. U.S. Pat. No. 5,635,457 discloses, in one embodiment, the use of a hydrocarbon mixture of which at least 95% has 11 or more carbon atoms and, in another embodiment, at least 95% has 10 or more carbon atoms.

Each of the above patents utilised a water column toxicity bioassay. All, except U.S. Pat. No. 5,498,596 which used a marine Copepod bioassay, used the Mysid shrimp bioassay.

The applicant has found that, for the (*Leptocheirus plumulosus*) acute sediment toxicity test, the toxicity rapidly decreases for a distillation fraction of hydrocarbons the higher its boiling point above about 270° C. A trend in toxicity reduction was noted for toxicity as the boiling range of the fluid increased.

SUMMARY OF THE INVENTION

According to a first aspect of the invention there is provided a method for reducing the sediment toxicity of a composition which includes a mixture of hydrocarbons, the mixture including hydrocarbons having a boiling point above about 270° C. and below about 340° C., the method including the steps of fractional distilling of the composition; and collecting a fraction of hydrocarbons having a boiling point above about 270° C. and below about 340° C.

It will be appreciated that the average molecular weight of the hydrocarbons of such collected fractions will depend on its isomeric content. In general, the more branched the hydrocarbons the higher its average molecular weight for a certain boiling point.

The sediment toxicity may be towards (*Leptocheirus plumulosus*) and the fraction of hydrocarbons may have a median lethal concentration ($LC_{50}$), in accordance with ASTM Guideline E 1367, EPA 600/R-94/025, of more than about 500 mg/kg and a Sediment Toxicity Ratio (STR) of greater than about 1.

The mixture of hydrocarbons may include hydrocarbons having a boiling point above about 280° C. and a fraction of hydrocarbons having a boiling point above about 280° C., a median lethal concentration ($LC_{50}$), in accordance with ASTM Guideline E 1367, EPA 600/R-94/025, of more than about 2000 mg/kg and a STR of about 1 or less, may be collected.

The mixture of hydrocarbons may include hydrocarbons having a boiling point above about 290° C. and a fraction of hydrocarbons having a boiling point above about 290° C., a median lethal concentration ($LC_{50}$), in accordance with ASTM Guideline E 1367, EPA 600/R-94/025, of more than about 2000 mg/kg and a STR of about 1 or less, may be collected.

The mixture of hydrocarbons may include hydrocarbons having a boiling point above about 300° C. and a fraction of hydrocarbons having a boiling point above about 300° C., a median lethal concentration ($LC_{50}$), in accordance with ASTM Guideline E 1367, EPA 600/R-94/025, of more than about 2000 mg/kg and a STR of about 1 or less, may be collected.

The mixture of hydrocarbons may include hydrocarbons having a boiling point above about 310° C. and a fraction of hydrocarbons having a boiling point above about 310° C., a median lethal concentration ($LC_{50}$), in accordance with ASTM Guideline E 1367, EPA 600/R-94/025, of more than about 2000 mg/kg and a STR of about 1 or less, may be collected.

The mixture of hydrocarbons may include hydrocarbons having a boiling point above about 320° C. and a fraction of hydrocarbons having a boiling point above about 320° C., a median lethal concentration ($LC_{50}$), in accordance with ASTM Guideline E 1367, EPA 600/R-94/025, of more than about 15000 mg/kg and a STR of about 1 or less, may be collected.

The composition may include isoparaffins and/or n-paraffins.

The composition may include aromatic hydrocarbons of up to about 0.1% maximum, preferably none.

The toxicity of the composition may be reduced for use in base oils and drilling fluids, or drilling mud compositions useful in the exploration for, and/or production of oil and gas.

The composition may be natural hydrocarbons selected from low aromatic crude derived diesels, mineral oils, hydrocarbons and/or n-paraffins derived from molecular sieving or extractive distillation processes.

The composition may also be synthetic hydrocarbons selected from a distillate product of an oligomerization of olefins process such as a Conversion of Olefins to Diesel (COD) process (SA Patent 92/0642), or other dimerised or trimerised olefins, which could be further hydrogenated if required. A zeolite type catalyst may catalyse such a conversion of olefins. Also, the composition may be iso-paraffins derived from skeletal isomerisation processes, and hydrocarbons derived from high or low temperature Fisher-Tropsch processes.

According to a second aspect of the invention, there is provided a method for producing a base oil for use in manufacturing of a drilling fluid, the method including the method for reducing the sediment toxicity of a composition as described above.

According to a third aspect of the invention, there is provided a method of manufacturing a drilling fluid, the method including the step of mixing the fraction of hydrocarbons, as described above, with one or more of diluents, synthetic or natural esters, plant oils, thinning agents, viscosifiers, emulsifiers, wetting agents, weighting agents, proppants, fluid loss control agents and/or particulate matter.

According to a fourth aspect of the invention, there is provided the use of a fraction of hydrocarbons, collected from a method as described above, for the manufacture of a base oil and/or a drilling fluid, or a drilling mud composition useful in the exploration for, and production of oil and gas.

According to a fifth aspect of the invention, there is provided a fraction of hydrocarbons, collected from a method as described above, for the manufacture of a base oil and/or a drilling fluid, or a drilling mud composition useful in the exploration for, and production of oil and gas.

The fraction may be a mixture of predominantly iso-paraffins and may have an initial boiling point as tested by ASTM D 86 of about 250° C., preferably at least about 260° C. and more preferably at least about 270° C. and even more preferably at least about 280° C. The fraction may have a final boiling point as tested by ASTM D 86 of between about 300° C. and 340° C., preferably about 330° C. The flash point of the fraction as tested by ASTM D 93 may be at least about 95° C., more typically above about 120° C. and most typically about 130° C. The viscosity of the fraction at 40° C. as measured by ASTM D 445 may fall between about 2 cSt and 5 cSt. The dynamic viscosity of the fraction at 0° C., as tested by the Brookfield Viscometer equipped with a UL adapter may be less than 20 cP, more typically less than 15 cP. Fractions with a Brookfield Viscosity of less than 10 cP at 0° C., 60 rpm may also be typical. The pour point of the fraction may typically be lower than −55° C., more commonly lower than −50° C. and most commonly lower than −40° C. The naphthene content of the fraction may be greater than 5% m/m as measured by 12×12 Mass Spectrometry (MS) analyses. The portion boiling above $C_{15}$ may contain a minimum of 60% iso-paraffinic molecules, more preferably more than 70% iso-paraffin's and most preferably more than 80% iso-paraffins. The average molecular mass of the detoxified fluid would be greater that 230.

The fraction may be a mixture of predominantly n-paraffins and may have an initial boiling point as tested by ASTM D 86 of about 250° C., preferably at least about 260° C., more preferably at least about 270° C. and even more preferably at least about 280° C. The fluid may have a final boiling point as tested by ASTM D 86 of between about 300° C. and 340° C., preferably about 330° C. The flash point of this material as tested by ASTM D 93 may be at least about 95° C., more typically above about 120° C. and most typically above about 130° C. The viscosity of the fluid at 40° C. as measured by ASTM D 445 may fall between about 2 cSt and 5 cSt. The pour point of this fluid may typically be lower than about 20° C. It will be appreciated that blends of this fraction with hydrocarbon mixtures having a lower pour point may be required to obtain a more suitable pour point, or solvents may be used where needed. The naphthene content of the well fluid may be greater than 5% m/m as measured by 12×12 MS analyses. The portion boiling above C15 may contain a minimum of 60% n-paraffinic molecules, more preferably more than 70% n-paraffin's and most preferably more than 80% n-paraffins. The average molecular mass of the detoxified fluid would be greater that 230.

According to a sixth aspect of the invention, there is provided a base oil and/or a drilling fluid, or a drilling mud composition useful in the exploration for, and production of oil and gas, the base oil and/or a drilling fluid, or a drilling mud composition including a fraction of hydrocarbons collected from a method as described above.

The drilling fluid may include a fraction of hydrocarbons collected from a method described above, a $C_{12}$-$C_{20}$ n-paraffin iso-paraffin mixture and a $C_{23}$ ester. The $C_{12}$-$C_{20}$ n-paraffin mixture may be a commercially available mixture and could be up to about 30% volume of the drilling fluid and the ester may be up to about 10% volume of the drilling fluid.

The drilling fluid may include up to about 70% of the predominantly iso-paraffinic fraction described above and a portion containing up to about 30% $C_{11}$ to $C_{20}$ of n-paraffin's and not more than about 9.5% of a plant ester component. The $C_{11}$ to $C_{20}$ of n-paraffin's may be commercially obtained and may typically be derived from a Fisher-Tropsch process. The drilling fluid may have an initial boiling point as tested by ASTM D 86 of between about 210° C. and 250° C., preferably about 240° C. The drilling fluid has a final boiling point as tested by ASTM D 86 of about 300° C., preferably at least about 310° C., more preferably at least about 320° C. and even more preferably about 330° C. Fluids boiling above 340° C. may also be possible. The flash point of the drilling fluid as tested by ASTM D 93 is at least about 90° C., more typically above about 100° C. and most typically about 110° C. The viscosity of the fluid at 40° C. as measured by ASTM D 445 may fall between about 2 cSt and 5 cSt. The dynamic viscosity at 0° C., as tested by the Brookfield Viscometer equipped with a UL adapter may be less than about 20 cP, more typically less than about 10 cP, even more typically less than about 9 cP and most typically less than about 8 cP. The pour point of the drilling fluid is typically higher than about −20° C., more commonly higher than about −15° C. and most commonly higher than about −10° C. The naphthene content of the drilling fluid may be more than 5% m/m as measured by 12×12 MS analyses.

The portion of the drilling fluid boiling below $C_{15}$ may include a minimum of n-paraffin content of at least about 50%, more preferably more than about 60% n-paraffin's and even more preferably more than about 70% n-paraffin's. The portion of the drilling fluid boiling above $C_{15}$ may include a minimum of about 50% iso-paraffins, preferably more than about 60% iso-paraffins and more preferably more than about 70% iso-paraffins. The portion of the drilling fluid boiling above $C_{15}$ may contain a minimum of 2%-oxygenated molecules. The average molecular mass of the detoxified fluid would be greater than 230.

DETAILED DESCRIPTION OF THE PREFERRED EMBODIMENT

The invention is now described in more detail and by way of non limiting examples.

In order for a drilling fluid to pass the stringent ten day marine amphipod (*Leptocheirus plumulosus*) acute sediment toxicity test in accordance with ASTM Guideline E 1367, EPA 600/R-94/025, a sample must exhibit a sediment toxicity ratio (STR) of less than or equal to 1.00 in order to pass the test. The STR was calculated using the following equation:

$$\frac{LC_{50} \text{ of Reference Material}}{LC_{50} \text{ of } NAF + (0.20 \times LC_{50} \text{ of Reference Material})}$$

where $LC_{50}$=median lethal concentration, Reference Material=$C_{16}$-$C_{18}$ internal olefin, and NAF=non-aqueous fluid.

The $LC_{50}$ value for different samples may vary from one batch to the other of marine organisms tested, *Leptocheirus* in this case, and an internal standard has therefore been built in i.e. the $C_{16}$-$C_{18}$ Internal Olefin.

Table 1 shows a typical sediment toxicity profile of fractions of a zero aromatic containing hydrocarbon mixture derived from a conversion of olefins to diesel process.

TABLE 1

| Fraction | Toxicity as $LC_{50}$ mg/kg | STR | Ave Molecular Weight |
| --- | --- | --- | --- |
| Full boiling range | <1000 | 2.84 | 221 |
| Boiling range 200-210° C. | 120 | 4.34 | 162 |
| Boiling range 210-220° C. | 117 | 4.35 | 169 |
| Boiling range 220-240° C. | 117 | 4.35 | 177 |
| Boiling range 240-260° C. | 131 | 4.29 | 196 |
| Boiling range 260-280° C. | 272 | 3.78 | 211 |
| Boiling range 280-320° C. | 2147 | 1.41 | 237 |
| Boiling range above 320° C. | 18227 | 0.22 | 298 |

Table 2 shows a typical sediment toxicity profile of fractions of a low aromatic content hydrocarbon mixture derived from a conversion of olefins to diesel process.

TABLE 2

| Fraction | Toxicity as $LC_{50}$ mg/kg | STR | Ave Molecular Weight |
| --- | --- | --- | --- |
| Full boiling range | <1000 | >2 | 220 |
| Boiling range 220-240° C. | 117 | 4.35 | 180 |
| Boiling range 240-260° C. | 131 | 4.29 | 198 |
| Boiling range 260-280° C. | 290 | 3.92 | 212 |
| Boiling range 280-320° C. | 1784 | 1.61 | 238 |
| Boiling range above 320° C. | 19314 | 0.21 | 297 |

Table 3 shows a typical sediment toxicity profile of fractions of a synthetic mixture of n-paraffins.

TABLE 3

| Fraction | Toxicity as $LC_{50}$ mg/kg | STR | Ave Molecular Weight |
| --- | --- | --- | --- |
| Full boiling range | <1000 | <2 | 200 |
| Boiling range 220-240° C. | <1000 | >1.6 | 166 |
| Boiling range 240-260° C. | <1000 | >1.6 | 171 |
| Boiling range 260-280° C. | 1299 | 1.33 | 183 |
| Boiling range 280-320° C. | 4064 | 0.52 | 208 |

Tables 1 to 3 clearly show a tendency of lower sediment toxicity for higher boiling hydrocarbons with a sharp decline in toxicity at about a boiling point of above about 270° C.

Table 4 gives the characterisation of an example of a typical fraction of predominantly iso-paraffins collected by means of the method for reducing the sediment toxicity of a composition which include a mixture of hydrocarbons, in accordance with the invention.

TABLE 4

| Properties | Units | Test method | Result |
|---|---|---|---|
| Sediment Toxicity Ratio | | ASTM E 1367 | <1.0 |
| Sediment Toxicity | mg/kg | ASTM E 1367 | >8000 |
| Carbon Content | % Carbon | ASTM D 5291 | 85.16 |
| Density @ 20° C. | Kg/L | ASTM D 4052 | 0.8084 |
| Flash point (PMcc) | ° C. | ASTM D 93 | 132.5 |
| Aromatic content | % m/m | UOP 495 | 0.06 |
| Total Sulphur | ppm m/m | ASTM D 3120 | <0.30 |
| Kinematic viscosity @ 40° C. | cSt | ASTM D 445 | 4.565 |
| Kinematic viscosity @ 100° C. | cSt | ASTM D 445 | 1.510 |
| Refractive Index | | ASTM D 1218 | 1.44726 |
| Pour point | ° C. | ASTM D 97 | <−51 |
| Distillation | | ASTM D 86 | |
| Initial boiling point | ° C. | | 275 |
| Final boiling point | ° C. | | 317 |
| Average Molecular Mass | | | 235 |

Table 5 gives the characterisation of an example of a typical fraction of predominantly n-paraffins collected by means of the method for reducing the sediment toxicity of a composition which include a mixture of hydrocarbons, in accordance with the invention.

TABLE 5

| Properties | Units | Test method | Result |
|---|---|---|---|
| Sediment Toxicity Ratio | | ASTM E 1367 | <1.0 |
| Sediment Toxicity | mg/kg | ASTM E 1367 | >3000 |
| Carbon Content | % Carbon | ASTM D 5291 | 84.74 |
| Density @ 20° C. | Kg/L | ASTM D 4052 | 0.7759 |
| Flash point (PMcc) | ° C. | ASTM D 93 | 136.5 |
| Aromatic content | % m/m | UOP 495 | <0.01 |
| Total Sulphur | Ppm m/m | ASTM D 3120 | <0.10 |
| Kinematic viscosity @ 40° C. | cSt | ASTM D 445 | 3.168 |
| Refractive Index | | ASTM D 1218 | 1.43583 |
| Pour point | ° C. | ASTM D 97 | 15 |
| Distillation | | ASTM D 86 | |
| Initial boiling point | ° C. | | 276 |
| Final boiling point | ° C. | | 310 |
| Average Molecular Mass | | | 232 |

Table 6 gives the characterisation of an example of a typical drilling fluid, in accordance with the invention.

TABLE 6

| Properties | Units | Test method | Result |
|---|---|---|---|
| Sediment Toxicity Ratio | | ASTM E 1367 | <1.0 |
| Sediment Toxicity | mg/kg | ASTM E 1367 | >4000 |
| Carbon Content | % Carbon | ASTM D 5291 | 84.44 |
| Density @ 20° C. | Kg/L | ASTM D 4052 | 0.8980 |
| Flash point (PMcc) | ° C. | ASTM D 93 | 110 |
| Aromatic content | % m/m | UOP 495 | 0.06 |
| Total Sulphur | ppm m/m | ASTM D 3120 | <0.30 |
| Kinematic viscosity @ 40° C. | cSt | ASTM D 445 | 3.470 |
| Dynamic viscosity @ 0° C. | cSt | Brookfield | 8.60 |
| Pour point | ° C. | ASTM D 97 | −19 |
| Distillation | | ASTM D 86 | |
| Initial boiling point | ° C. | | 244 |
| Final boiling point | ° C. | | 329 |
| Average Molecular Mass | | | 229 |

The applicant believes that the invention provides a flexible method for detoxifying hydrocarbons, which may be used in a variety of environmentally exposed applications. The invention also allows the rheology and other characteristics of such detoxified fractions, as described, to be manipulated for use in specific applications.

What is claimed is:

1. A method for producing low sediment toxicity hydrocarbons suitable for use in a drilling fluid, the method comprising the steps of:
   dimerizing, trimerizing, or oligomerizing olefins using a zeolite type catalyst, whereby dimerized, trimerized, or oligomerized olefins are obtained;
   hydrogenating the dimerized, trimerized, or oligomerized olefins, whereby a hydrogenated composition is obtained;
   fractional distilling the hydrogenated composition; and
   collecting a fraction of hydrocarbons having a boiling point above about 280° C. and below about 320° C. and having a sediment toxicity towards *Leptocheirus plumulosus* with a median lethal concentration ($LC_{50}$), in accordance with ASTM Guideline E 1367, EPA 600/R-94/025, of more than about 500 mg/kg, wherein the fraction of hydrocarbons comprises low sediment toxicity hydrocarbons.

2. A method as claimed in claim 1, wherein the fraction of hydrocarbons has an iso-paraffin to n-paraffin ratio of more than 1.

3. A method as claimed in claim 2, wherein the iso-paraffins are obtained by skeletal isomerization of the dimerized, trimerized, or oligomerized olefins.

4. A method as claimed in claim 1, wherein the step of collecting comprises collecting a fraction of hydrocarbons having a boiling point above about 290° C., a $LC_{50}$, in accordance with ASTM Guideline E 1367, EPA 600/R-94/025, of more than about 2000 mg/kg and a STR of about 1 or less.

5. A method as claimed in claim 1, wherein the step of collecting comprises collecting a fraction of hydrocarbons having a flash point of above about 120° C.

6. A method as claimed in claim 5, wherein the fraction of hydrocarbons has a dynamic viscosity at 0° C. of less than 15 cP.

7. A method as claimed in claim 1, wherein the fraction of hydrocarbons comprises a portion boiling above a boiling point of $C_{15}$ hydrocarbons, the portion comprising a minimum of 60% iso-paraffinic molecules.

8. A method as claimed in claim 1, wherein the fraction of hydrocarbons has an average molecular mass of greater than 230.

* * * * *